United States Patent [19]
Walsh et al.

[11] Patent Number: 5,632,402
[45] Date of Patent: May 27, 1997

[54] CARTON BLANK AND METHOD FOR FORMING IT

[75] Inventors: Joseph C. Walsh; Robert L. Conatser, both of Longmont, Colo.

[73] Assignee: Graphic Packaging Corporation, Paoli, Pa.

[21] Appl. No.: 587,753

[22] Filed: Jan. 17, 1996

Related U.S. Application Data

[63] Continuation-in-part of Ser. No. 336,982, Nov. 14, 1994, abandoned, which is a continuation-in-part of Ser. No. 51,628, Apr. 22, 1993, abandoned, which is a continuation-in-part of Ser. No. 994,132, Dec. 21, 1992, abandoned.

[51] Int. Cl.⁶ .................................................. B65D 5/56
[52] U.S. Cl. ...................... 220/418; 220/462; 229/3.1; 229/198.2; 229/246; 493/95; 493/99; 493/907
[58] Field of Search ............................ 220/416, 418, 220/460, 461, 462, 463; 229/125.05, 125.32, 198.2, 246, 3.1; 428/34.2, 35.7; 493/95-99, 374, 379, 907

[56] References Cited

U.S. PATENT DOCUMENTS

| | | | |
|---|---|---|---|
| 1,845,891 | 2/1932 | Schroeder | 229/198.2 |
| 2,196,243 | 3/1940 | Bensel . | |
| 2,305,371 | 12/1942 | Yates | 220/418 |
| 2,416,332 | 2/1947 | Lehman | 229/125.32 |
| 2,550,520 | 4/1951 | Bennett | 229/198.2 |
| 2,996,235 | 8/1961 | Turpin | 220/416 |
| 3,194,471 | 7/1965 | Murphy | 220/416 |
| 3,198,416 | 8/1965 | Hickin et al. | 220/418 |
| 3,288,345 | 11/1966 | Dilot | 220/461 |
| 3,640,447 | 2/1972 | Forbes, Jr. et al. | 220/418 |
| 3,910,482 | 10/1975 | Bamburg et al. | 220/418 |
| 3,951,333 | 4/1976 | Forbes, Jr. et al. . | |
| 4,053,102 | 10/1977 | Stark | 220/418 |
| 4,139,119 | 2/1979 | Mclaren | 220/461 |
| 4,171,064 | 10/1979 | Friess et al. | 220/418 |
| 4,254,173 | 3/1981 | Peer, Jr. . | |
| 4,471,884 | 9/1984 | Kuchenbecker | 220/462 |
| 4,526,314 | 7/1985 | Reil | 220/462 |
| 4,720,015 | 1/1988 | Brauner | 220/461 |
| 4,768,703 | 9/1988 | Sosler et al. . | |
| 4,771,938 | 9/1988 | Hambleton . | |

FOREIGN PATENT DOCUMENTS

| | | | |
|---|---|---|---|
| 239316 | 9/1987 | European Pat. Off. | 229/3.1 |
| 1516536 | 1/1968 | France | 229/3.1 |
| 208467 | 3/1909 | Germany | 220/460 |
| 176994 | 3/1922 | United Kingdom | 220/418 |

*Primary Examiner*—Gary E. Elkins
*Attorney, Agent, or Firm*—Klaas, Law, O'Meara & Malkin, P.C.; Joseph J. Kelly

[57] ABSTRACT

A carton blank formed from a laminate of a relatively flexible fluid impervious material and a relatively rigid paperboard material is provided with paperboard to paperboard facing surfaces so that an effective seal can be formed.

4 Claims, 1 Drawing Sheet

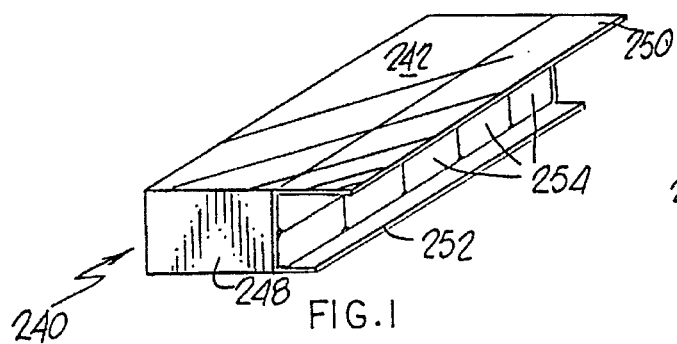
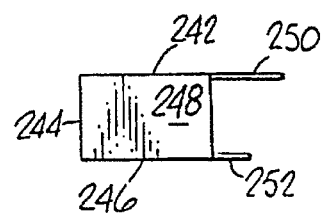
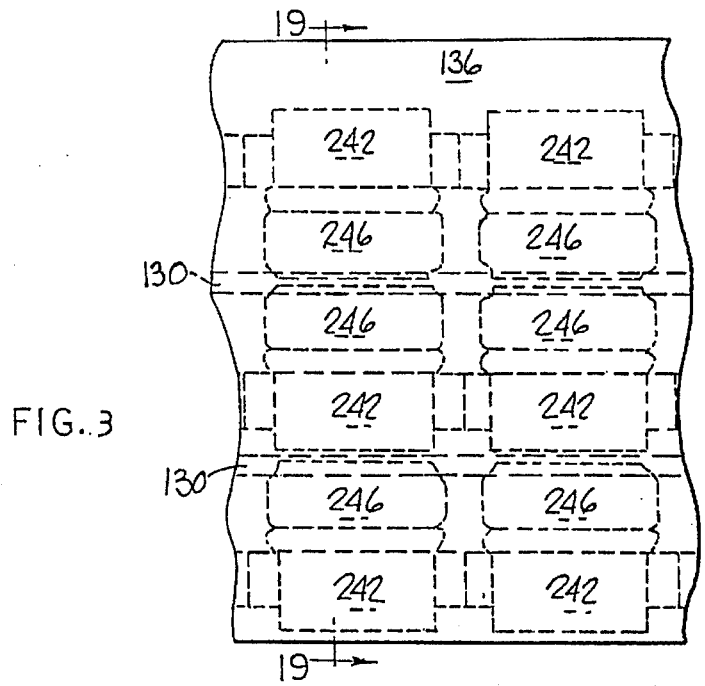
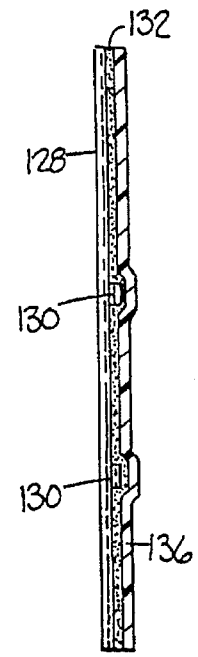
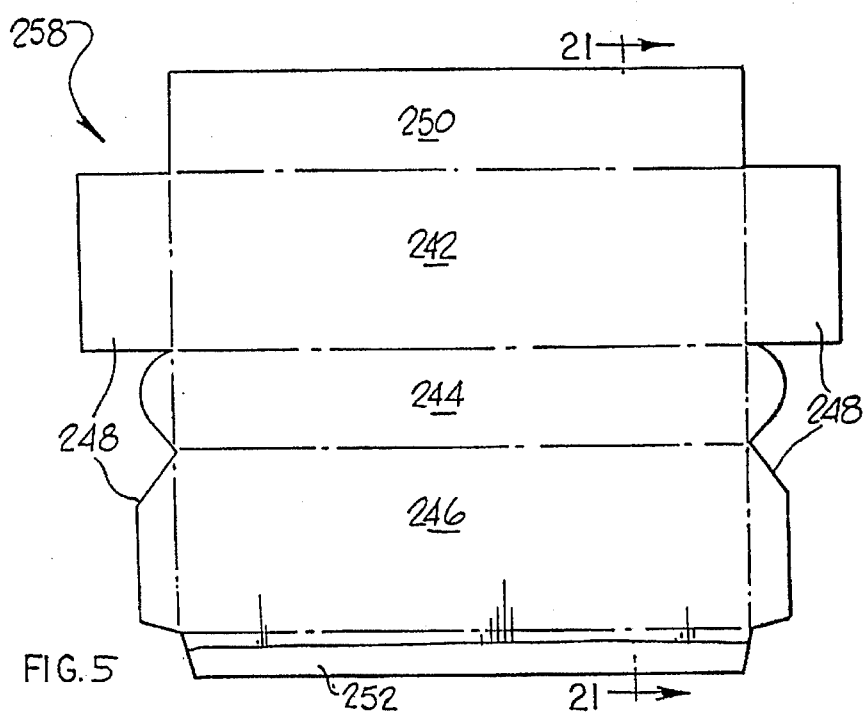
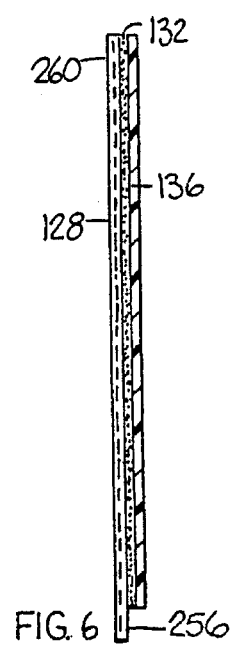

CARTON BLANK AND METHOD FOR FORMING IT

This application is a continuation-in-part of U.S. patent application Ser. No. 08/336,982 filed Nov. 14, 1994 now abandoned which application was a continuation-in-part of U.S. patent application Ser. No. 08/051,628 filed Apr. 22, 1993 (now abandoned) which application was a continuation-in-part of U.S. patent application Ser. No. 07/994,132 filed Dec. 21, 1992 (now abandoned).

FIELD OF THE INVENTION

This invention relates generally to paperboard carton blanks having a plastic outer surface and more particularly to providing a paperboard carton blank having a plastic outer surface with means for forming an effective seal.

BACKGROUND OF THE INVENTION

Many paperboard carton blanks on the market are formed from a laminate of a reverse printed or surface printed plastic film adhesively secured to paperboard or other similar materials. The plastic film and the paperboard are generally non-compatible in forming an effective seal when using a water base adhesive. This presents a problem when only a water base adhesive is available.

BRIEF DESCRIPTION OF THE INVENTION

This invention provides a carton blank having a reverse printed or surface printed plastic film secured to substantially all of a paperboard base but leaving an exposed portion of the paperboard base so that when the carton blank is folded to form a carton there are provided paperboard to paperboard facing surfaces to form an effective seal.

In a preferred embodiment of the invention, the carton blank is formed from a laminate comprising a unitary sheet of relatively rigid material having an inner surface and an outer surface and having a left side edge, a right side edge, a top edge and a bottom edge. The unitary sheet of a relatively rigid material has a plurality of cut and fold lines for dividing the unitary sheet of a relatively rigid material into at least a plurality of sidewall panels, a closure panel, a glue tab panel and end panels. Each of the plurality of sidewall panels, the closure panel, the glue tab panel and the end panels has an outer surface. A unitary sheet of a relatively flexible fluid impervious material is superposed over and secured to the outer surfaces of the sidewall panels, the closure panel, the end panels and only a portion of the glue tab panel and not secured to a remaining portion of the glue tab panel. The unitary sheet of a relatively flexible fluid impervious material has a portion thereof superposed over the remaining a portion of the glue tab panel. A strip of a relatively flexible material is located between the remaining portion of the glue tab panel and the portion of the unitary sheet of a relatively flexible fluid impervious material and is secured to the portion of the unitary sheet of a relatively flexible fluid impervious material so that the portion of the unitary sheet of the relatively flexible fluid impervious material and the strip of a relatively flexible material may be removed to leave the remaining portion of the glue tab panel exposed so that when the laminate is cut to form individual carton blanks and each carton blank is folded to form a carton there are provided paperboard to paperboard facing surfaces on the glue tab panel and the closure panel so that an effective seal can be formed using a water based adhesive.

BRIEF DESCRIPTION OF THE DRAWING

An illustrative and presently preferred embodiment of the invention is shown in the accompanying drawing in which;

FIG. 1 is a perspective view of a carton of this invention;

FIG. 2 is an end elevational view of FIG. 1;

FIG. 3 is a top plan view of a portion of a laminate from which the carton blanks are formed;

FIG. 4 is a cross-sectional view taken on the line 4—4 of FIG. 3;

FIG. 5 is an enlarged top plan view of one of the carton blanks of FIG. 3; and

FIG. 6 is a cross-sectional view taken on the line 6—6 of FIG. 5.

DETAILED DESCRIPTION OF THE INVENTION

In FIGS. 1 and 2, there is illustrated a carton 240 having a plurality of sidewall panels 242, 244 and 246 and sealed together end panels 248. As illustrated in FIGS. 1 and 2, the closure panel 250 and the glue tab panel 252 are in an opened condition so that packages 254 of cigarettes may be inserted therein. At the manufacture's plant for making cigarettes, after the packages 254 have been inserted, the closure panel 250 is temporarily sealed to the glue tab panel 252 and loaded into large boxes for shipment to distributing centers. During shipment the seal between the closure panel 250 and the glue tab panel 252 breaks. This is done because at the distributing centers, it is necessary to apply the state and/or local tax stamps. After the tax stamps have been applied, the closure panel 250 is then permanently sealed to the glue tab panel 252. Since there are so many distributing centers, it is common for them to use conventional apparatus to apply a water base adhesive to secure the closure panel 250 to the glue tab panel 252. When a carton is formed from a composite material such as in the Peer, Jr. U.S. Pat. No. 4,254,173, the glue tab panel 252 has a plastic surface facing the paperboard surface of the closure panel 250. Therefore, a water base adhesive will not be compatible to these surfaces so that a permanent seal cannot be made. Other surface materials may also result in non-compatible surfaces.

In FIGS. 3 and 4, there is illustrated a laminate from which a carton blank can be formed to have desired reverse printed plastic film as an outer surface and still have compatible paperboard to paperboard surfaces on the closure panel 250 and the glue tab panel 252. The laminate of FIGS. 3 and 4 is formed using conventional laminating apparatus. A continuous web 128 of a relatively rigid material, such as paperboard, is fed into the laminating apparatus to have a longitudinal extent in the machine direction, and two or more spaced apart continuous strips 130 of a relatively flexible material, such as paper, are superposed over portions of the continuous web 128 to have a longitudinal extent in the machine direction. A liquid plastic material 132 or an adhesive material is applied to the exposed surfaces of the continuous web 128 and the continuous strips 130. A reverse printed plastic film is moved into contact with the plastic material or an adhesive and is secured to portions of the continuous web 128 of a relatively rigid material and the two or more spaced apart continuous strips 130 of a relatively flexible material. After this, the laminate is passed through apparatus, such as a vacuum roll, where the continuous strips 130 with portion of the plastic film 136 adhered thereto are pulled away from the laminate to leave a portion 256 of the continuous web 128 exposed. The lower continuous strip 130 has a width that is one-half the width of the upper continuous strip 130. When the laminate of FIGS. 3 and 4 is cut to form individual carton blanks, the upper continuous strip 130 is cut in half along its longitudinal extent. When the carton blank 258 of FIGS. 5 and 6 is folded around the fold lines, the portion 256 will face the portion 260 of the continuous web 128 so that a water based adhesive may be used to form a permanent seal between these compatible surfaces. The carton blanks 258 are illustrated in FIG. 3 only to show that the glue tab panel portions 252 extend in the machine direction.

The thickness of the various materials such as the continuous web 128, the plastic adhesive or coating 132 or 230, the continuous strip 130 and the plastic film have been exaggerated for illustration purposes. The continuous web 128, the plastic adhesive or coating 132 or 230 and the plastic film would be similar to the corresponding materials in the U.S. Pat. No. 4,254,173 to Peer, Jr. which patent is incorporated herein by reference thereto. The continuous strips 130 may comprise a kraft paper having a thickness of between about 0.75 and 1.0 mils or other types of materials having similar characteristics.

While illustrative and presently preferred embodiments of the invention have been described in detail herein, it is to be understood that the inventive concepts may be otherwise variously embodiment and employed and that the appended claims are intended to be construed to include such variations except insofar as limited by the prior art.

We claim:

1. A carton blank comprising:

a unitary sheet of a relatively rigid material having an inner surface and an outer surface;

said unitary sheet of a relatively rigid material having a left side edge, a right side edge, a top edge and a bottom edge;

said unitary sheet of a relatively rigid material having a plurality of cut and fold lines for dividing said unitary sheet of a relatively rigid material into at least a plurality of sidewall panels, a closure panel, a glue tab panel and end panels;

each of said plurality of sidewall panels, said closure panel, said glue tab panel and said end panels having an outer surface; and a unitary sheet of a relatively flexible fluid impervious material superposed over and secured to said outer surfaces of said at least a plurality of said sidewall panels, said closure panel, said end panels and only a portion of said glue tab panel so that the remaining portion of said outer surface of said glue tab panel portion is exposed for forming an effective seal with the exposed portion of said closure panel of said unitary sheet of a relatively rigid material.

2. A carton blank as in claim 1 wherein:

said unitary sheet of a relatively rigid material comprising paperboard; and said unitary sheet of a relatively flexible fluid impervious material comprising a plastic material.

3. A carton blank as in claim 1 wherein:

said unitary sheet of a relatively flexible fluid impervious material is non-compatible to a water based adhesive.

4. A method for forming a carton blank comprising:

moving a continuous web of a relatively rigid material having a longitudinal extent in a machine direction through laminating apparatus;

superposing a plurality of spaced apart continuous strips of a relatively flexible material having longitudinal extents in a machine direction over said continuous web of a relatively rigid material;

applying an adhesive material to the exposed surfaces of said continuous web of a relatively rigid material and said plurality of spaced apart continuous strips of a relatively flexible material;

securing a continuous film of a relatively flexible material to at least portions of said continuous web of a relatively rigid material and said plurality of spaced apart continuous strips of a relatively flexible material; and removing said plurality of spaced apart continuous strips of a relatively flexible material and the portions of said film of a relatively flexible material adhered thereto so as to form exposed portions of said continuous web of a relatively rigid material.

* * * * *